Figure 1:
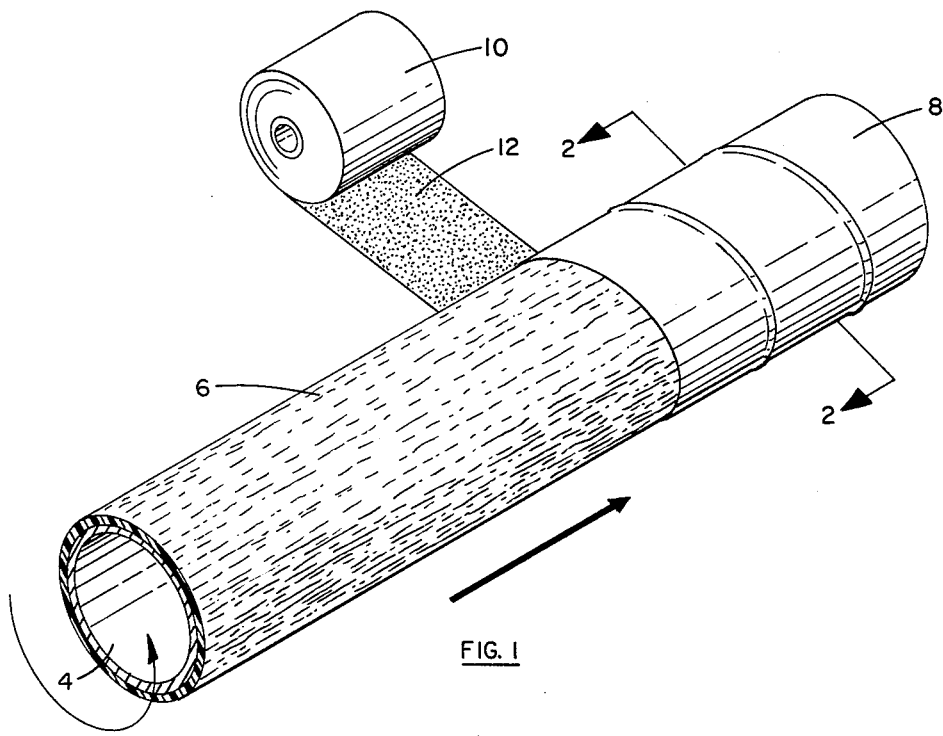

Jan. 25, 1966    F. E. McNULTY    3,231,443
METHOD OF APPLYING PROTECTIVE WRAPPING TO METALLIC CONDUITS
Filed Jan. 18, 1963

United States Patent Office 3,231,443
Patented Jan. 25, 1966

3,231,443
METHOD OF APPLYING PROTECTIVE WRAPPING TO METALLIC CONDUITS
Frank E. McNulty, Tulsa, Okla., assignor to Nee & McNulty, Inc., a corporation of Oklahoma
Filed Jan. 18, 1963, Ser. No. 252,319
6 Claims. (Cl. 156—187)

This invention relates to a new and useful corrosion preventative protective wrapping incorporating a laminated film material, and additionally relates to a method of applying the same in cohesive relation to metallic conduits and the like. In accordance with the present invention, it is proposed to improve handling and applying a novel wrapping method to pipelines by the use of materials heretofore considered desirable but impractical to apply.

Various laminates of plastic films with pressure sensitive rubbers, butyl rubbers, and vinyl fortified tars have been used as a wrapping material for protecting pipelines from external corrosion. These laminated films are bonded to the pipe through pressure sensitive action or by the use of solvent primers to soften the side of the laminate placed next to the pipe causing the film to become tacky. As the solvents are released, a tough adhesive bond is formed between the film and the metal surface. The elasticity of the plastic film component of the laminate exerts pressure on these bonding materials, i.e., rubbers, tars, etc., and particularly with said materials susceptible to cold flow, enhances this bonding action.

It has been known for sometime that epoxy resins that are catalytically cured provide excellent materials for water proofing the interior of oil and gas pipelines. It is current practice in the gas transmission industry to spray epoxy resins on the interior of the pipe, which is usually done at the point of pipe fabrication. The fact that the time required for these resins to achieve their ultimate cure or hardness may vary substantially, due to changing temperatures, is unimportant since the coating applied to the inside of the pipe receives no abrasion during handling of the pipe immediately after application. It has not been practical, however, to apply these resins to the outside of pipe, because they can require too much time to cure before the resulting coated pipe can be handled. In rolling, moving and handling, the coated pipe joints contact one another causing them either to stick together or to break the continuity of the resin film.

Consideration has been given to applying epoxy resins in the field but the fact that these materials are thermosetting gives rise to a number of probelms. For example if conventional epoxy resins were applied at temperatures below 35° F., it might take several days for them to cure. Because it has been shown necessary to have a two-coat system to eliminate pin holes, it becomes impractical to leave partially coated pipe exposed for several days or longer. Waiting for two coats to cure, obviously delays the installation of the pipe line.

Hot applied coal tar and asphalt enamels have been more widely used than any other coating material due to the fact that they are thermoplastic and become solid at atmospheric temperatures. This means that they can be lowered into ditches and backfilled within a very short time after the hot melted coating material is applied to the outside of the steel pipe. While relatively crude, this method of treating pipe to prevent corrosion has been most widely used since it has a controllable setting or hardening time. Because this is possible, the entire construction of a cross-country pipeline can proceed without serious delays from the use of this corrosion prevention treatment.

More and more pipelines are operating at higher pressures and, accordingly, the pipeline coating materials are subjected to higher underground temperatures. At present, new lines are being designed and installed for underground operating temperatures in the range of 180° to 200° F. The resin materials now in use not only soften and flow at temperatures within the aforesaid range, but are also subject to cold flow deformation. This is true for various rubbers, waxes, and vinyl fortified tars. The weight of the overlying soil tends to force sharp rocks, etc., through any of the above mentioned materials in a relatively short time. These coating materials have the further disadvantage in that solvent primers used in their application tend to evaporate rapidly on windy days regardless of the temperature. Thus, the primer used to solvent weld the coating to the pipe dries, under such circumstances, before the laminated tapes can be mechanically wound thereon. This occurs particularly where the machines applying the tapes are stopped to change rolls, leaving an exposed section of primed pipe three or four feet long. It is necessary to re-prime this short section manually. When the machines are stopped every three or four hundred feet to change rolls, this can result in considerable delay. Another disadvantage of present laminated films such as those made from butyl rubbers or the pressure sensitive rubber films is that these materials when in roll form tend to cone on standing.

It is an object of this invention to provide a protective coating system for conduits, such as oil and gas pipelines, involving a resin-laminated wrapper or tape overlying a film of a catalytic curable adhesive material which has, in turn, been applied to the exterior of said pipelines. It is another object of my invention to provide a means for applying to said pipelines a waterproof, corrosion resistant coating having as one of its essential components a cured epoxy resin film and applying the latter to a layer of an uncured epoxy resin spread over a metal surface. It is a further object of my invention to provide a means of coating or wrapping such pipelines under adverse weather conditions. It is still another object of my invention to provide a method for coating a surface with an uncured catalytically settable resin and covering the latter, while in an uncured state, with a second layer of cured resin which may be the same or different, whereby an intimate bond is formed between said cured and uncured layers of resin by catalytic action.

In the drawings, FIGURE 1 is a fragmentary view of a length of pipe having a coating system embodying the features of my invention.

Figure 2:
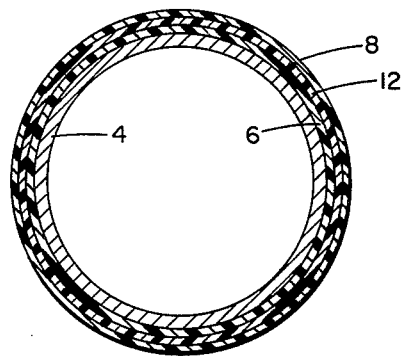

FIGURE 2 is a cross sectional view taken along line 2—2 of FIGURE 1.

A length of pipe 4 is first coated with a thin film of a suitable uncured epoxy resin 6 applied by spraying, brushing or other conventional means. Onto the epoxy resin 6, which contains a curing catalyst, is wound a laminated wrapping material 8 such as polyvinyl chloride, polyethylene, kraft paper, etc., having as an inner layer a cured thermosetting resin 12. The wrapping material, dispsensed from roll 10, is wound tightly about the length of coated pipe 4 so as to assure the formation of a permanent bond between resin layers 6 and 12 and to expel air bubbles or pockets of air that may be present between the uncured resin surface and the laminated tape during the wrapping process.

While the description which follows is directed primarily to applications of epoxy resins, it is to be strictly understood that other resin materials capable of being cured or set by the use of catalysts or crosslinking agents are likewise contemplated. Examples of other such resins are the polyamides, the polyester resins, e.g., the unsaturated polyesters, and the like.

In one of its preferred embodiments, my invention comprises the use of a plastic film such as plasticized polyvinyl chloride, polyethylene, or other similar film that can be used below ground without deterioration. On the inside surface of this film is an adhering layer of cured epoxy resin. The thickness of the plastic film may vary from one or two mils upward, depending upon the weight of the pipe being protected, its diameter, its depth of backfill, and other similar considerations of a mechanical nature. The thickness of the epoxy resins may be of the order of three mils or more, depending upon service requirements. This laminated film is applied by spiral wrapping with line traveling machines. The resin side of the laminated film is applied to a prime coat of uncured epoxy resin having a catalyst incorporated therein. The film is stretched tightly against the uncured resin to provide complete and intimate contact under pressure. The pressure comes from the elasticity of the plastic film, which is applied under tension. A suitable overwrap such as tar-saturated fifteen pound asbestos felt may be applied on top of the laminated film to provide additional mechanical protection during lowering-in and backfilling operations. In this type of application wind action and other normally adverse weather conditions have no effect on the curing and bonding action of the prime coat to the previously cured epoxy resin laminated film. As used in my invention, the plastic film component is employed as a carrier to transfer a cured film of epoxy resin to an uncured resin layer covering a metal surface. The prime coat may be applied approximately one or two mils thick depending upon mechanical and field conditions. This method of application results in a two layer system of epoxy resin on the outside of the pipe in which the innermost layer is capable of curing to a proper state of hardness without interfering in any way with construction operations.

Any resin which will cure or set hard, either naturally or artificially under conditions of application can be used. Typically these resins are thermosetting resins, i.e. resins capable of undergoing permanent physical change under the influence of ambient temperature or artificially induced higher temperature. Polyester or epoxy resins are examples. Other suitable resins include urea, resorcinol, and phenol formaldehyde, and the like. Epon 828, an epoxy resin manufactured by Shell Chemical Company, is an example of a preferred epoxy resin. As is well known in this art, these resins may be combined and various catalysts or curing agents employed in various concentrations so that the setting or curing time or pot life for any particular application and/or temperature may be controlled. Versamid resin 140, a polyamide manufactured by General Mills, Inc., is an example of a preferred catalyst which, in the ratio of about 30 parts by volume to 70 parts of the Epon 828 epoxy resin, has a pot life at room temperature of about 3 to 3½ hours. These resins when set become quite hard and form a very strong bond with a metal surface. The optimum ratio of polyamide to epoxy will depend on the specific application and the commercial resin employed. Higher percentages of polyamide improve peel strength; lower percentages permit retention of bond at somewhat higher temperatures. The more flexible the bond required, of course, the higher the amount of polyamide needed.

The polyester resins contemplated for use in my invention are preferably the unsaturated polyesters. They are created by reacting a dihydric alcohol and a dibasic acid, either or both of which contain a double bonded pair of carbon atoms. The alcohol and the acid are heated to sufficiently high temperatures to react, split out water, and form ester linkages. The double bonds in the unsaturated polyester resin thus formed render the material capable of subsequent cross-linking. This is generally accomplished by reacting the unsaturated polyester resin with polymerizable monomer (e.g., styrene) under the influence of a special catalyst system (e.g., peroxide). In the reaction, the double bonds of the unsaturated polyester resin connect with those of the monomer (described as co-polymerization or cross-linking) to form a thermoset which, when fully cured, is insoluble and infusible.

While I refer to the wrapping material used in the method of my invention as a "laminate," it should be understood that the resin placed on the plastic or equivalent film need not be strongly bonded to said film. As pointed out herein, the film serves primarily as a carrier for the cured resin layer to be placed over a prime coat of uncured or partially cured resin. Hence the layer of cured resin need be bonded to said film only strongly enough to prevent delamination during the wrapping operation.

As the film or backing material, I generally prefer to use polyvinyl chloride. A thin, e.g., two to three mils, layer of resin and curing agent is applied to said film by any suitable means such as by brushing or spraying. The resulting film may then be run thru a suitable baking oven at a temperature of from about 100° to about 250° F. and at a speed of about ten to twenty feet per minute. The laminate thus produced is then rolled in spools of the desired size. In the laminating operation both the film and the resin may be preheated, e.g., 100° to 150° F. prior to application of the resin. This procedure generally aids in the formation of better adhesion between the resin and the backing film.

When polyethylene is used as the backing film, improved adhesion to the film is obtained by the use of higher molecular weight polyacides, i.e., polyamides having amine values from about 225 to about 250. Also suitable compositions for bonding to polyethylene film may be prepared from equal parts of liquid epoxy resin and a typical polyamide having an amine value of from 210 to 230. These polyamides react directly with the epoxy resin system, thus distributing the stress and impact loads throughout the resulting bond. Polyamides of the type contemplated are prepared, for example, by reacting a dimer of linoleic acid with a diamine such as ethylene diamine. The commercial polyamides are amber-colored thermoplastic resins with molecular weights up to 10,000 and melting points ranging up to 375° F.

Catalytically cured or hardened resins, like the epoxies, can withstand high temperature, i.e. 180° to 200° F., such as are generated in high pressure gas lines, without decomposition or deforming. They are very hard materials when properly cured and are not subject to penetration by rocks and other hard materials that may come in contact with coatings of said resins during construction operations. These resins have a considerably high dielectric strength than other coating materials previously used which means that on a mil for mil basis they are more effective under cathodic protection and a smaller quantity of these materials will give very adequate underground waterproofing. Because the resins of the type contemplate herein are thermosetting materials wherein the setting or hardening process can be controlled by the use of catalysts, such resins are not susceptible to drying by the action of wind during construction operations. In the form of laminated tape using, for example, polyvinyl chloride film and an epoxy resin, there is no migration between the epoxy resin and the vinyl film to cause any blocking out of the rolls of tape in storage. This means a wider selection of plastic films can be used than is possible with other adhesives used in laminated pipe wrap tapes owing to the absence of solvents and plasticizers in the epoxy resin.

Those familiar with the art to which the present invention is directed will recognize that it has a number of variations and modifications. For example, substantially any coating composition applied to the inside of the wrapper or film may be catalytically bonded to the uncured layer of resin. Also, a heavy paper such as kraft paper, or its equivalent, may be used in place of the above mentioned plastic films as the carrier. The resins employed, if desired, may be combined with certain compatible fillers or extenders such as, for example, talc, coal tar, iron oxide, and the like. In order to improve adhesion of resin to polyethylene and similar plastic wrapping materials, the inner portion may be buffed, abraded, or rolled in such a way as to give it an irregular surface.

I claim:

1. A method for applying a protective coating to a conduit, which comprises first covering the exterior surface of said conduit with a continuous adhesive layer of uncured thermosetting resin containing a catalyst capable of curing said resin and thereafter applying a laminated wrapping material to said uncured resin by tightly wrapping said material onto the surface of said uncured layer, said material comprising a film backing portion and a cured thermosetting resin inner layer adhering to said backing portion, whereby on standing said inner layer and said uncured layer are bonded together by the setting action of said uncured resin.

2. The method of claim 1 in which said backing portion is a plastic film.

3. A method for applying a protective coating to a conduit, which comprises first covering the exterior surface of said conduit with a continuous, adhesive layer of uncured thermosetting resin containing a catalyst capable of curing said resin and thereafter applying a laminated wrapping material to said uncured resin by tightly wrapping said material into the surface of said uncured layer, said material comprising a film backing portion and a cured thermosetting resin layer adhering to said backing portion, the latter being a wrapping material selected from the group consisting of polyvinyl chloride, polyethylene and kraft paper, said cured and uncured resins being selected from the group consisting of epoxy, polyamide and unsaturated polyesters, whereby on standing said inner layer and said uncured layer are bonded together by the setting action of said uncured layer.

4. The method of claim 1 wherein said backing portion is polyethylene.

5. The method of claim 1 wherein said backing portion is polyvinyl chloride.

6. The method of claim 1 wherein at least one of said cured and uncured resins is an epoxy resin.

References Cited by the Examiner

UNITED STATES PATENTS

| | | | |
|---|---|---|---|
| 2,924,546 | 2/1960 | Shaw | 156—187 XR |
| 2,937,665 | 5/1960 | Kennedy | 156—187 XR |
| 2,998,324 | 8/1961 | Hirt | 117—138.8 |
| 3,023,126 | 2/1962 | Underwood et al. | 117—138.8 |
| 3,063,891 | 11/1962 | Boylan et al. | 156—310 |

FOREIGN PATENTS

| | | |
|---|---|---|
| 714,987 | 9/1954 | Great Britain. |
| 819,831 | 9/1959 | Great Britain. |

EARL M. BERGERT, *Primary Examiner.*